Jan. 16, 1962  J. A. SMYSER  3,016,934
WHEEL SUPPORTING APPARATUS
Filed June 8, 1959  2 Sheets-Sheet 2

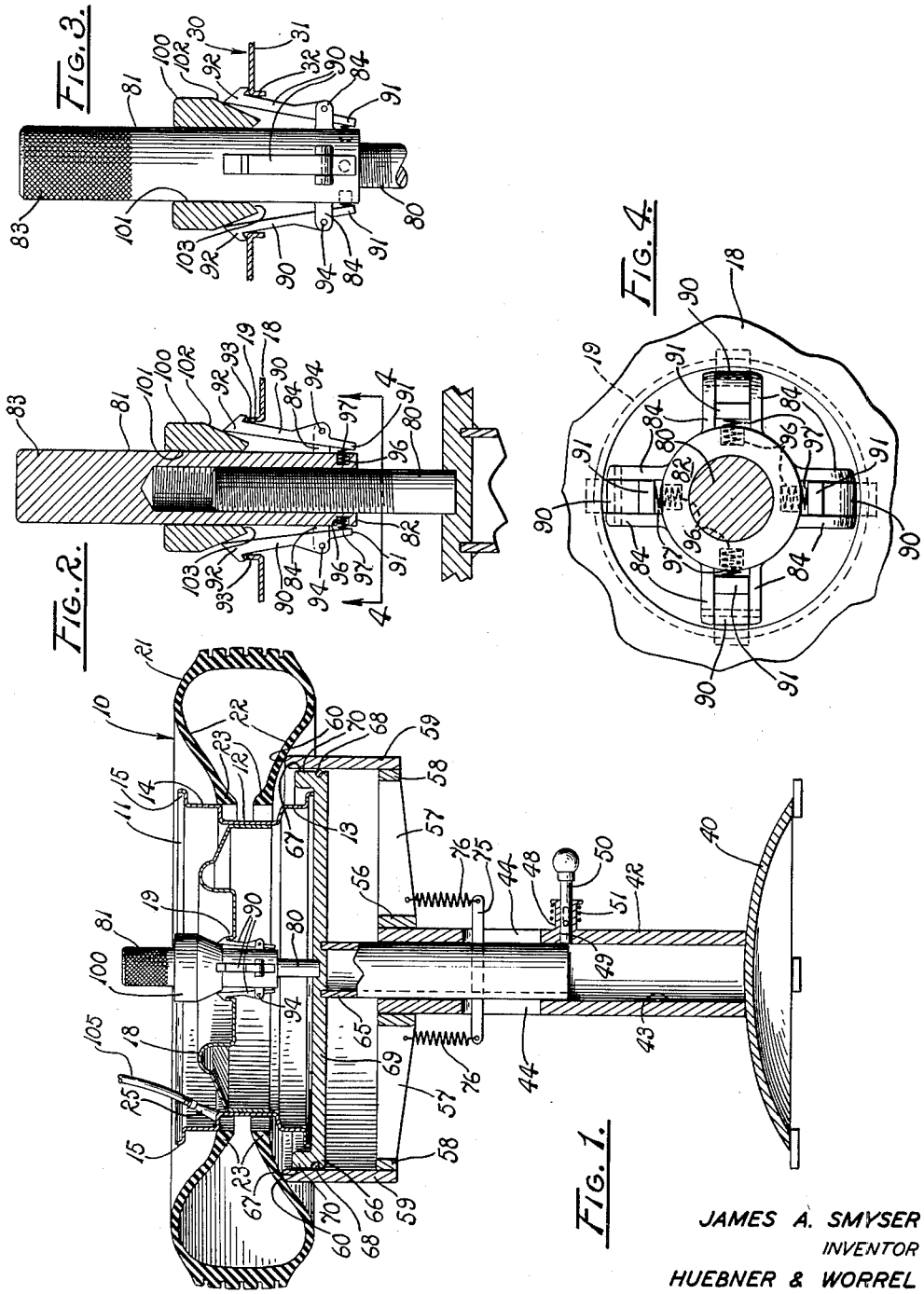

JAMES A. SMYSER
INVENTOR
HUEBNER & WORREL
ATTORNEYS
BY
Richard M. Worrel

United States Patent Office 3,016,934
Patented Jan. 16, 1962

3,016,934
WHEEL SUPPORTING APPARATUS
James A. Smyser, 207 Harrison, Taft, Calif.
Filed June 8, 1959, Ser. No. 818,951
6 Claims. (Cl. 144—288)

The present invention relates to a wheel supporting apparatus and more particularly to such an apparatus for holding the wheel of a vehicle in a work position to facilitate such operations as tire changing and inflation.

As is well-known, the beads of a tubeless tire must engage the rim on which the tire is mounted in air-tight relation for inflation purposes. Because of the significance of this bead-rim relationship, great care must be exercised when changing the tire so as not to damage the bead or the rim. In addition, difficulty is experienced in obtaining a seal between the beads and the rim as air is initially pumped into the tire during inflation thereof after complete, or nearly complete, deflation.

To facilitate such operations as tire changing and inflation, wheel supporting stands have been provided in the past. Usually these have included a table on which the wheel is rested in horizontal position, a threaded bolt is upwardly extended from the table and through the hub opening of the wheel, and a large, conical lock-down nut is releasably screw-threaded on the bolt for tightening down against the wheel to hold it firmly on the table. Although this apparatus dependably holds the wheel and facilitates tire changing, it is not adequate for tire inflation purposes. In addition, a band is usually constricted in circumscribing relation about the tire to hold the beads tightly against the rim of the wheel. This is a cumbersome, time consuming, and inefficient operation. The band is inconvenient to employ. Being separable from the table, the band and the lock-down nut are frequently misplaced, or located so remotely from the table as to preclude truly efficient operation. Further, even when such conventional lock-down nut is available, it is time consuming to use because of the extensive screw-threaded travel required to tighten it into place and to remove it.

Therefore, it is an object of the present invention to provide an improved wheel supporting apparatus for tire changing, repair and inflation purposes.

Another object is to facilitate inflation of tubeless tires.

Another object is to facilitate changing and repair of tubeless tires.

Another object is to provide an initial seal between tubeless tires and their rims to facilitate inflation of the tires.

Another object is to provide a simple device for holding a wheel on a supporting platform.

Another object is to minimize the time, inconvenience and labor associated with clamping a wheel in a work position.

Another object is to provide a wheel supporting and lock-down apparatus wherein all of the parts thereof can be kept on the apparatus at all times.

Another object is to provide such a supporting and lock-down device which is quickly and easily adjustable between locking and releasing positions.

These, together with other objects, will become more fully apparent upon reference to the following description and accompanying drawing.

In the drawing:

FIG. 1 is an elevational section taken through a wheel supporting apparatus embodying the principles of the present invention and showing a wheel having a tubeless tire thereon mounted on the apparatus.

FIG. 2 is a somewhat enlarged, fragmentary, axial section taken through a portion of the apparatus of FIG. 1 and showing how a wheel with one type of hub is supported in the apparatus.

FIG. 3 is a view similar to FIG. 2 but showing use of the apparatus with a wheel having a different type of hub from that illustrated in FIG. 2.

FIG. 4 is a somewhat enlarged fragmentary section taken on line 4—4 of FIG. 2.

Figure 5:
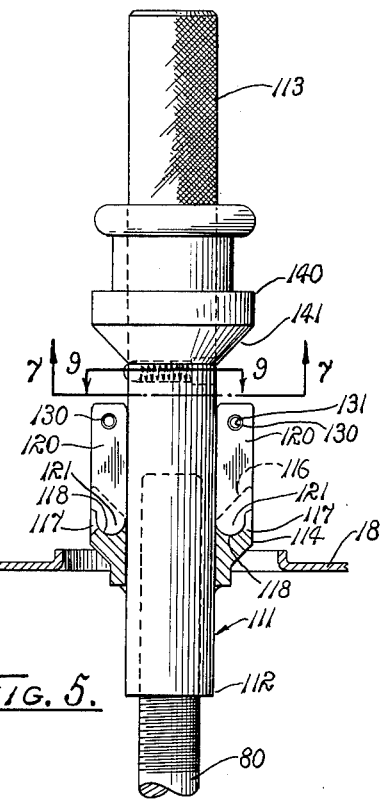
FIG. 5 is a fragmentary axial section similar to FIG. 2 but showing a second form of locking device in retracted position.

Referring more particularly to the drawing, and before specifically describing the subject wheel mounting apparatus, reference is initially made to a wheel 10 with which the subject apparatus is adapted for use. The wheel includes an annular drop center type rim 11 having a recessed central portion 12, inside flange 13, outside flange 14, and bead engaging flanges 15. A circular disk 18 is rigidly connected within the rim and provides an annular hub 19 concentric to the rim and extended outwardly of the wheel. That is, the hub provides an outer edge directed outwardly of the wheel.

Reference to "outwardly" as used herein is intended to refer to that side of the wheel which normally faces outwardly when the wheel is mounted on a vehicle, not shown. The wheel mounts a pneumatic tubeless tire 21 including a pair of spaced side walls 22 terminating in annular beads 23. As is conventional, the tire circumscribes the rim, and when inflated, the beads bear outwardly in air-tight engagement with bead engaging flanges 15. When the tire is deflated, however, the beads are contracted relatively close to each other and are spaced so as to fit between the inside and outside flanges 13 and 14 in spaced relation to the central portion 12.

It is also to be noted that some types of wheels, as fragmentarily shown in FIG. 3 and indicated by the numeral 30, provide a disk 31 having a hub 32 extended inwardly of the wheel, in contrast to the hub 19.

The wheel mounting apparatus of the subject invention conveniently includes a base 40 adapted to rest on the floor or on the ground and a tubular column 42 rigidly upwardly extended from the base. The column provides an axial bore 43 and a pair of diametrically opposed, longitudinally extended slots 44 opening into the bore.

A sleeve bearing 48 is rigidly radially outwardly extended from the column 42 in axial alignment with a transverse opening 49 leading into the bore 43. The bearing is located below the slots 44 and slidably receives a latch pin 50 for slidable movement between a latching position extended into the bore and a retracted position out of the bore, as seen in FIG. 1. A latching spring 51 is interposed between the pin and the bearing for yieldably urging the pin into latching position.

An annular hub 56 is rigidly connected in circumscribing relation to an upper end of the column 42, and a plurality of circumferentially spaced webs 57 are rigidly radially outwardly extended from the hub and joined at outer ends by an annular rim 58. An annular wall 59 has inner and outer cylindrical surfaces, an upper tire engaging edge 60, and is concentric to an axis of revolution therefor. The wall is rigidly connected in circumscribing relation to the rim in axially upright concentric relation to the column 42 and with the tire engaging edge upwardly disposed in a substantially horizontal plane.

An elongated cylindrical post 65 is longitudinally slidably fitted in the column 42 for elevational movement therein and has a lower end adapted to rest on the latch pin 50 when the latter is in latching position and the post is elevationally positioned above the pin. With the pin retracted, however, as in FIG. 1, it bears against the outer surface of the post permitting the described elevational movement of the post.

A rigid circular wheel supporting or backing platform or table 66 is rigidly concentrically mounted on an upper end of the post 65 and provides an outer edge 67 in slidable air-tight edge engagement with the wall 59. A resiliently compressible O-ring 68 is circumscribingly fitted in a groove in the outer edge of the platform and provides the described slidable air-tight fitted relationship between the platform and the wall. Preferably, the platform includes a central portion 69 and an outer upwardly extended annular marginal flange 70.

An elongated bar 75 is rigidly transversely connected to the post 65 intermediate its upper and lower ends and is extended diametrically outwardly from the post through the opposed slots 44 in the column 42. Platform elevating tension springs 76 individually interconnected opposite ends of the bar and upwardly adjacent webs 57. The springs resiliently yieldably urge the platform 66 upwardly toward the tire engaging edge 60.

An elongated, externally threaded spindle 80 is rigidly concentrically upwardly extended from the platform 66 and is therefore coaxial with the column 42 and the post 65. A sleeve-type spindle nut or spinning member 81 is screw-threadably connected on the spindle for axial as well as rotatable adjustable movement on the spindle. The nut has a lower end 82 and an upper end 83 which is externally knurled for convenience in manual manipulation of the nut. Pairs of adjacent spaced ears 84 are rigidly radially outwardly extended with such pairs being in circumferentially spaced relation, as best seen in FIG. 4.

Wheel engaging and clamping detent arms 90 provide lower ends 91 and upper angulated V-shaped ends 92 providing notches 93. The arms are individually pivotally supported intermediate their upper and lower ends between the pairs of ears 84 but relatively adjacent to the lower ends by pintles or axis members 94. The arms are thus mounted for pivotal movement about axes substantially tangential to a circle concentric to the spindle 80 between contracted positions with their upper ends inwardly against the nut 81 and outwardly expanded positions with their upper ends outwardly spaced from the nut. Each arm has a center of gravity above and inwardly of its pivotal axis whereby the arms are naturally gravitationally urged toward contracted positions when the nut is at rest. Further, the nut provides a plurality of pockets 96 in its lower end 82 and opening outwardly in individually opposed relation to the lower ends 91 of the arms. Detent retracting compression springs 97 are fitted in these pockets and bear outwardly against the lower ends of the arms also yieldably to urge the arms into their contracted positions.

An annular, detent wedging sleeve 100 provides a bore 101 axially slidably fitted on the spindle nut 81, an outer frusto-conical wedging surface 102 convergently tapered toward the lower end 82 of the nut, and an annular downwardly directed socket 103 downwardly divergently extended with respect to the lower end of the nut. The sleeve is adapted for slidable movement between a lower wedging position frictionally fitted between the nut and the arms 90 to urge the latter into expanded positions, and a retracted position upwardly displaced from between the nut and the arms.

In the wedging position, the wedging surface 102 slidably engages the upper ends 92 of the arms 90. In the retracted position of the sleeve, the upper ends of the arms are adapted to fit into the socket 103 whereby the collar also acts to hold the arms in retracted positions and whereby the arms serve to support the sleeve on the nut.

Operation

The operation of the described embodiment of the subject invention is believed to be readily apparent and is briefly summarized at this point.

If it is desired to inflate the tire 21 of the wheel 10, the inside flange 13 of the rim 11 is placed on the central portion 69 of the backing platform 66. In this regard, it is to be noted that the outside diameter of the marginal flange is slightly less than the minimum diameter of the marginal flange 70 of the platform. Prior to positioning the rim on the platform, the detent arms 90 are placed in their contracted positions with the socket 103 of the collar 100 receiving the upper ends 92 of the arms. In this way the hub 19 of disk 18 fits downwardly over the collar and the arms. Also, the downwardly disposed side wall 22 of the tire is in overlaying engagement with the tire engaging edge 60 of the wall 59.

If the latch pin 50 is then retracted, the weight of the rim 11 depresses the platform 66 causing the outside, or now upwardly located, flange 14 or upper bead engaging flange to press downwardly against the tire 21 thereby urging the lower wall 22 of the tire into air-tight engagement with the tire engaging edge 60.

With the wedging sleeve 100 retracted, the spindle nut 81 is spun downwardly on the spindle 80 whereby centrifugal force thrusts the detent arms 90 outwardly about their pivot axes. When the nut has been moved sufficiently downwardly on the spindle, the arms in their expanded positions fit over the upwardly extended hub 19. More specifically, the notches 93 fit over the upwardly disposed edge of the hub. Further movement of the spindle nut downwardly clamps the arms against the hub thereby to hold the rim 11 on the platform 66. Although the collar 100 may then be dropped into wedging position, it will be evident that an air-tight chamber is provided within the tire inasmuch as the upper wall 22 is in air tight engagement with the rim 11, the lower wall of the tire is in air-tight engagement with the tire engaging edge 60 and the platform is in air-tight engagement with the annular wall 59. Inflation of the tire, as by means of the air hose 105, causes the lower wall of the tire to leverage about the tire engaging edge so that the upper tire wall elevates the rim. In so doing, the platform is elevated so that when the tire is fully inflated, the lower end of the post 65 is above the latch pin 50 whereupon the latter moves into its latching position to lock the platform in its uppermost position. During inflation, the beads 23 of the tire move outwardly against the flanges 15.

The spindle nut 81 is then rotated in the opposite direction to that described above so as to move the nut upwardly away from the platform 66. This moves the notches 93 of the detent arms 90 upwardly out of engagement with the hub 19 so that they can be moved into their contracted positions either gravitationally or by the springs 97, or both. Of course, if the sleeve 100 has been employed it is first elevated into retracted position. With the wheel 10 unlatched, the wheel with its tire inflated is then removed from the apparatus.

With wheels 30 having the type of hub 32, it is found best to employ the sleeve 100 for the purpose of dependably wedging and clamping the wheel 30 against the platform 66. In other respects, the operation of the apparatus is the same as that described in connection with the wheel 10 having the hub 19.

Second form of locking device

A second form of the locking device is shown in FIGS. 5 through 8 which is found to possess unusually effective locking characteristics for all types of automotive wheels in devices of the character described and which can speedily and easily be moved between locking and unlocking positions. The spindle 80 is again shown in FIGS. 5 through 8 having a spindle body 111 screw threadably mounted on the spindle for axial and rotatable adjustable movement thereon. The nut has a lower end 112 and an upper end 113 which is externally knurled for convenience in manipulating the nut. A collar 114 is rigidly secured on the spindle body, as by welding at 115. The collar provides a funnel shaped upper end portion 116. At 90° intervals about the collar, radial grooves 117 are cut through the conical upper end portion and the bottom of the grooves provided with pockets 118 having semi-cylindrical bottom surfaces.

Figure 6:
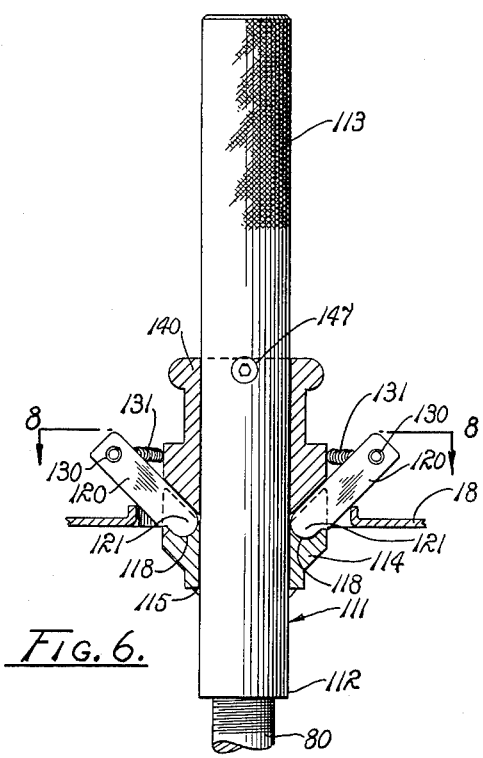
FIG. 6 is a view similar to FIG. 5 but showing the locking device in locking position.
Figure 7:
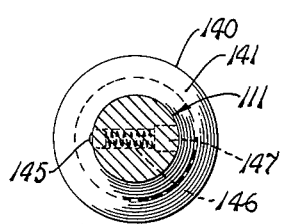
FIG. 7 is a section taken on line 7—7 of FIG. 5.
Figure 8:
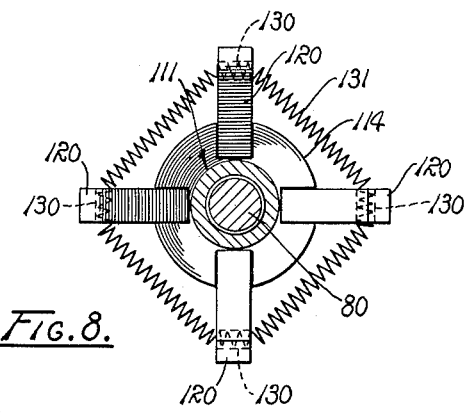
FIG. 8 is a section taken on line 8—8 of FIG. 6.
Figure 9:
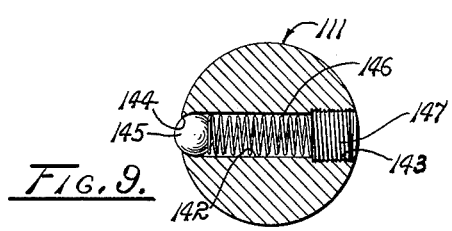
FIG. 9 is a section taken on line 9—9 of FIG. 5.

An arm or detent 120 is mounted in each of the pockets for pivotal movement between an upwardly retracted position, as shown in FIG. 5, and a locking position, shown in FIG. 6. Each of the arms is substantially rectangular in profile except at its lower end portion which is provided with a semi-cylindrical portion 121 rotatably received in its arm's respective pocket 118. The arms are of such a thickness as to fit into pockets and so mounted are pivotal in the collar between the retracted and locking positions.

To urge the arms into retracted position, each arm is provided with a bore 130 in the upper end thereof and a tension spring 131, or other elastic means, is threaded through the bores and constricted about the spindle body 111.

A wedging sleeve 140 is slidably mounted on the spindle body 111 and provides a downwardly disposed conical surface 141 which is complementary to the upper end portion 116 of the collar 114. It will be evident that the weight of the sleeve urges it toward the detents 120. A bore 142 is drilled transversely nearly through the body 111 to provide an opening therethrough which is constricted at 144. A ball 145 is located in the bore in a position to protrude through the constricted opening 145. A spring 146 is placed against the ball within the bore and held in compression by a stud 147 screw-threadably mounted in the end 143 of the bore. The ball 145 protrudes from the outer surface of the body a distance sufficiently to support the sleeve 140 in elevationally retracted position. The spring pressed ball functions as a releasable support for the sleeve. When it is desired to lower the sleeve, sufficient pressure is applied downwardly thereon to cause retraction of the ball 145 against the spring 146 whereupon the sleeve gravitationally descends against the detents 120 and urges them outwardly.

The operation of this locking device is similar to that described for the first form of the device. When a wheel 18 is located on the table 66 or other support in circumscribing relation to the spindle 80, the sleeve is pressed downwardly sufficiently to retract the ball 145 whereupon the sleeve descends gravitationally on the body 111. The lower surface 141 of the sleeve wedges the detents 120 outwardly for engagement with the wheel. This outwardly urging is preferably augmented by a swift rotation of the body 111 by an operator. Such rotation is in a direction to cause the body to screw downwardly upon the spindle and to impart centrifugal force to the detents urging them into the position shown in FIG. 6 dependably holding the wheel in position. When the sleeve 140 has been released from the ball 145 prior to rotation of the body 111, the sleeve settles downwardly on the outwardly pivoting detents and blocks their upward movement. In fact, when the sleeve is gravitationally rested on the detents they cannot be pivoted upwardly from the positions shown in FIG. 6 without breaking the mounting structure described.

When it is desired to release the locking device, the sleeve 140 is manually elevated until supported on the ball 145. As the sleeve is elevated, the spring 131 pivots the detents upwardly and inwardly to release the wheel 18, which thereupon may be lifted from the table 66 and the spindle 80. The body 111 is then rotated in the opposite direction for screw-threaded movement upwardly on the spindle to retracted position.

From the foregoing, it will be evident that an apparatus has been provided for supporting a wheel in a manner such as to facilitate inflation and changing of the tire. The apparatus, is, of course particularly adapted for use with tubeless tires. Of particular significance is the locking device employed for quickly and conveniently locking the wheel on the platform and releasing the same for removal from the platform.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an apparatus for releasably supporting a wheel, the wheel including an annular rim circumscribed by a tire and circumscribing a disk providing a central hub concentric to the rim, a rigid backing member against which such a wheel is adapted to be positioned, a spindle rigidly extended from the backing member and adapted to extend through the hub of the disk, a spinning member mounted on the spindle for spinning movement about the spindle and concurrent movement axially of the spindle, and detents connected to the spinning member for pivotal movement about axes substantially tangential to a circle concentric to the spindle, the detents having normally contracted positions closely adjacent to the spinning member to enable reception of the hub thereover, the detents being thrust into outwardly expanded positions by centrifugal force when the spinning member is spun about the spindle and being thereby moved into locking engagement with the hub as the spinning member is moved axially of the spindle toward the hub.

2. The apparatus of claim 1 wherein an annular wedging collar is axially slidably fitted on the spinning member for movement between a wedging position releasably frictionally fitted between the detents and the spinning member to wedge the detents against the hub, and a retracted position.

3. The apparatus of claim 2 wherein the detents have outwardly extended ends, and wherein the wedging collar has an annular socket directed toward the pivot axes of the detents and adapted to receive the extended ends of the detents when the detents are contracted and the collar is retracted thereby releasably to hold the detents in contracted positions.

4. The apparatus of claim 1 wherein the detents are weighted thereby to be gravitationally urged into said contracted positions.

5. A securing device comprising a substantially axially erect cylindrical body member having an internally screw-threaded bore, a collar rigidly mounted in circumscribing relation on the body having an upwardly disposed conical surface and providing upwardly disposed pockets at 90° intervals thereabout located in a common plane normal to the axis of the body, and each providing substantially semi-cylindrical bottoms a plurality of detents having lower ends complementarily fitted to the pockets for pivotal movement of said detents between retracted positions extended upwardly along the body member and workpiece engaging positions pivoted outwardly from the body and having extended ends providing bores therethrough, a tension member extended through the bores urging the detents into retracted position, and a sleeve slidably mounted on the body above the detents having a downwardly disposed conical surface complementary to the upwardly disposed surface of the collar.

6. The securing device of claim 5 including releasable latch means mounted in the body engageable with the sleeve to support the sleeve in upwardly retracted position above the detents.

(References on following page)

References Cited in the file of this patent

UNITED STATES PATENTS

| | | | |
|---|---|---|---|
| 220,995 | Shedlock | Oct. 28, | 1879 |
| 1,726,012 | Bilz | Aug. 27, | 1929 |
| 1,896,629 | Julian | Feb. 7, | 1933 |
| 1,920,592 | Peters | Aug. 1, | 1933 |
| 2,045,778 | Huntley et al. | June 30, | 1936 |
| 2,057,200 | McCarthy | Oct. 13, | 1936 |
| 2,081,402 | Krema | May 25, | 1937 |
| 2,117,073 | Wochner | May 10, | 1938 |
| 2,464,638 | Falkner | Mar. 15, | 1949 |
| 2,471,642 | Moltz | May 31, | 1949 |
| 2,874,759 | Ranallo | Feb. 24, | 1959 |
| 2,895,519 | Coats | July 21, | 1959 |
| 2,900,015 | Harrison | Aug. 18, | 1959 |

FOREIGN PATENTS

| | | | |
|---|---|---|---|
| 210,126 | Australia | May 10, | 1956 |